(12) United States Patent
Toda (10) Patent No.: US 8,683,376 B2
(45) Date of Patent: Mar. 25, 2014

(54) SERVER UNIT, A CLIENT UNIT, AND A RECORDING MEDIUM IN A COMPUTER SYSTEM

(75) Inventor: Naoto Toda, Tokorozawa (JP)

(73) Assignee: Casio Computer Co., Ltd, Tokyo (JP)

( * ) Notice: Subject to any disclaimer, the term of this patent is extended or adjusted under 35 U.S.C. 154(b) by 435 days.

(21) Appl. No.: 12/405,417

(22) Filed: Mar. 17, 2009

(65) Prior Publication Data

US 2009/0241057 A1    Sep. 24, 2009

(30) Foreign Application Priority Data

Mar. 18, 2008    (JP) ................................. 2008-070365

(51) Int. Cl.
*G06F 3/048* (2013.01)

(52) U.S. Cl.
USPC .......................................... 715/781; 715/788

(58) Field of Classification Search
USPC ............ 715/765, 744, 781; 709/203; 345/667
See application file for complete search history.

(56) References Cited

U.S. PATENT DOCUMENTS

| | | | |
|---|---|---|---|
| 4,833,535 A | 5/1989 | Ozeki et al. | |
| 5,544,358 A | 8/1996 | Capps et al. | |
| 5,634,052 A | 5/1997 | Morris | |
| 5,673,404 A | 9/1997 | Cousins et al. | |
| 5,818,616 A | 10/1998 | Kawai | |
| 5,848,415 A | 12/1998 | Guck | |
| 6,006,231 A | 12/1999 | Popa | |
| 6,016,478 A | 1/2000 | Zhang et al. | |
| 6,192,393 B1 | 2/2001 | Tarantino et al. | |
| 6,204,846 B1 | 3/2001 | Little et al. | |
| 6,343,313 B1 | 1/2002 | Salesky et al. | |
| 6,363,352 B1 | 3/2002 | Dailey et al. | |
| 6,434,599 B1 | 8/2002 | Porter | |
| 6,518,983 B1 | 2/2003 | Grohmann et al. | |
| 6,556,217 B1 * | 4/2003 | Makipaa et al. ............. | 345/667 |

(Continued)

FOREIGN PATENT DOCUMENTS

| | | |
|---|---|---|
| EP | 0689342 | 12/1995 |
| EP | 1450277 | 8/2004 |

(Continued)

OTHER PUBLICATIONS

OA mailed Dec. 8, 2010 for U.S. Appl. No. 11/693,346, 22 pages.

(Continued)

*Primary Examiner* — Amy Ng
*Assistant Examiner* — William Titcomb
(74) *Attorney, Agent, or Firm* — Amin, Turocy & Watson, LLP (57) ABSTRACT

When having determined that the input event from a client unit is the selection of an object, a server unit requests the client unit to transmit display area information that sets a display screen area on the drawing data. The server unit acquires the display area information transmitted from the client unit in response to the request. The server unit determines whether the area of the object selected on the drawing data fits in the display screen area corresponding to the acquired display area information. If having determined that the area of the object does not fit in the display screen area, the server unit changes the display area information so that the area of the object may fit in the display screen area and transmits the changed display area information to the client unit. The client unit displays the drawing data received from the server unit.

16 Claims, 8 Drawing Sheets

(56) References Cited

U.S. PATENT DOCUMENTS

| | | |
|---|---|---|
| 6,636,888 B1 | 10/2003 | Bookspan et al. |
| 6,647,360 B2 | 11/2003 | Graham et al. |
| 6,658,167 B1 | 12/2003 | Lee et al. |
| 6,661,353 B1 | 12/2003 | Gopen |
| 6,664,969 B1 | 12/2003 | Emerson et al. |
| 6,704,024 B2 | 3/2004 | Robotham et al. |
| 6,710,790 B1 | 3/2004 | Fagioli |
| 6,725,268 B1 | 4/2004 | Jackel et al. |
| 6,732,103 B1 | 5/2004 | Strick et al. |
| 6,907,447 B1 | 6/2005 | Cooperman et al. |
| 6,973,457 B1 | 12/2005 | Bastawala et al. |
| 6,983,331 B1 | 1/2006 | Mitchell et al. |
| 7,200,615 B2 | 4/2007 | Eschbach et al. |
| 7,277,572 B2 * | 10/2007 | MacInnes et al. ............ 382/154 |
| 7,346,856 B2 | 3/2008 | Nguyen et al. |
| 7,502,867 B2 | 3/2009 | Mitchell et al. |
| 7,570,275 B2 * | 8/2009 | Idesawa et al. ............... 345/684 |
| 7,814,171 B2 | 10/2010 | Blegen et al. |
| 7,844,915 B2 * | 11/2010 | Platzer et al. ................ 715/781 |
| 7,886,044 B2 | 2/2011 | Maki et al. |
| 7,996,045 B1 | 8/2011 | Bauer et al. |
| 8,072,435 B2 | 12/2011 | Hsieh et al. |
| 2002/0080177 A1 * | 6/2002 | Orbanes et al. ............... 345/765 |
| 2002/0082811 A1 | 6/2002 | Honjas et al. |
| 2003/0020758 A1 | 1/2003 | Hinderks |
| 2003/0063043 A1 | 4/2003 | Girard |
| 2004/0169668 A1 | 9/2004 | Yamada et al. |
| 2004/0217980 A1 | 11/2004 | Radburn et al. |
| 2005/0024364 A1 | 2/2005 | Shouen |
| 2005/0058330 A1 | 3/2005 | Mitsuhashi et al. |
| 2005/0086259 A1 | 4/2005 | Eschbach et al. |
| 2005/0091596 A1 * | 4/2005 | Anthony et al. ............. 715/712 |
| 2005/0102631 A1 | 5/2005 | Andreas et al. |
| 2005/0172221 A1 * | 8/2005 | Kobashi et al. ............... 715/513 |
| 2005/0187945 A1 | 8/2005 | Ehrich et al. |
| 2005/0210399 A1 * | 9/2005 | Filner et al. ................... 715/767 |
| 2005/0259881 A1 | 11/2005 | Goss |
| 2005/0281482 A1 | 12/2005 | Nishiyama |
| 2006/0050973 A1 | 3/2006 | Ishikawa |
| 2006/0110171 A1 | 5/2006 | Miyazawa et al. |
| 2006/0123121 A1 | 6/2006 | Maegawa et al. |
| 2006/0174026 A1 | 8/2006 | Robinson et al. |
| 2006/0209094 A1 | 9/2006 | Usuda |
| 2006/0221097 A1 | 10/2006 | Kagechi et al. |
| 2007/0005690 A1 | 1/2007 | Corley et al. |
| 2007/0130251 A1 | 6/2007 | Ohtsuka |
| 2007/0143803 A1 | 6/2007 | Lim |
| 2007/0150829 A1 * | 6/2007 | Eschbach et al. ............. 715/781 |
| 2007/0192509 A1 | 8/2007 | Ohtsuka et al. |
| 2007/0211066 A1 * | 9/2007 | Kanda .......................... 345/531 |
| 2007/0234229 A1 | 10/2007 | Ohtsuka et al. |
| 2007/0245021 A1 * | 10/2007 | Ohtsuka et al. ............... 709/225 |
| 2007/0297596 A1 | 12/2007 | Matsubara |
| 2008/0059569 A1 * | 3/2008 | Kanda et al. .................. 709/203 |
| 2008/0077660 A1 | 3/2008 | Tomida |
| 2008/0256477 A1 | 10/2008 | Cho et al. |
| 2009/0013210 A1 | 1/2009 | Mcintosh et al. |
| 2009/0016641 A1 | 1/2009 | Paladini et al. |
| 2009/0063972 A1 * | 3/2009 | Ma et al. ....................... 715/716 |
| 2009/0070699 A1 | 3/2009 | Birkill et al. |
| 2009/0094263 A1 | 4/2009 | Shiran et al. |
| 2009/0264157 A1 | 10/2009 | Hsieh et al. |
| 2009/0287736 A1 | 11/2009 | Shike et al. |
| 2009/0287815 A1 | 11/2009 | Robbins et al. |
| 2009/0327976 A1 | 12/2009 | Williamson et al. |
| 2010/0150522 A1 | 6/2010 | Schmehl |
| 2010/0235732 A1 | 9/2010 | Bergman |
| 2010/0250660 A1 | 9/2010 | Toda et al. |
| 2011/0145750 A1 | 6/2011 | Yodo et al. |
| 2012/0062494 A1 | 3/2012 | Hsieh et al. |

FOREIGN PATENT DOCUMENTS

| | | |
|---|---|---|
| EP | 1503344 | 2/2005 |
| JP | 55-37609 | 3/1980 |
| JP | 56-166548 | 12/1981 |
| JP | 01-272280 | 10/1989 |
| JP | 2-22987 | 1/1990 |
| JP | 04-034663 | 2/1992 |
| JP | 05-284368 | 10/1993 |
| JP | 06-326856 | 11/1994 |
| JP | 07-319447 | 12/1995 |
| JP | 08-009168 | 1/1996 |
| JP | 08-116545 | 5/1996 |
| JP | 09-044338 | 2/1997 |
| JP | 10-042221 | 2/1998 |
| JP | 10-074173 | 3/1998 |
| JP | 10-320356 | 12/1998 |
| JP | 10-326232 | 12/1998 |
| JP | 11-045167 | 2/1999 |
| JP | 11-331610 | 11/1999 |
| JP | 2001-103491 | 4/2001 |
| JP | 2001-127644 | 5/2001 |
| JP | 2002-024567 | 1/2002 |
| JP | 2002-024862 | 1/2002 |
| JP | 2002-049558 | 2/2002 |
| JP | 2003-050694 | 2/2003 |
| JP | 2003-158534 | 5/2003 |
| JP | 2003-198857 | 7/2003 |
| JP | 2003-271508 | 9/2003 |
| JP | 2004-503862 | 2/2004 |
| JP | 2004-086550 | 3/2004 |
| JP | 2004-171063 | 6/2004 |
| JP | 2004-348380 | 12/2004 |
| JP | 2005-027193 | 1/2005 |
| JP | 2005-128279 | 5/2005 |
| JP | 2005-228227 | 8/2005 |
| JP | 2005-267158 | 9/2005 |
| JP | 2005-267395 | 9/2005 |
| JP | 2006-031476 | 2/2006 |
| JP | 2007-519091 | 7/2007 |
| JP | 2007-241710 | 9/2007 |
| JP | 2008-134853 | 6/2008 |
| WO | 0197014 A2 | 12/2001 |
| WO | 0197014 A3 | 12/2001 |
| WO | 02/079913 | 10/2002 |
| WO | 0243365 | 5/2005 |
| WO | 2005057353 | 6/2005 |

OTHER PUBLICATIONS

Japanese Office Action for 2008-070365 mailed on Mar. 30, 2010.
Japanese Office Action for 2006-036652 mailed on Apr. 13, 2010.
Office Action for U.S. Appl. No. 11/693,346 mailed on Jun. 3, 2010.
Office Action for U.S. Appl. No. 11/683,763 mailed on Apr. 30, 2010.
Japanese Office Action for Japanese Patent Application No. 2006-036653 mailed on May 31, 2011.
U.S. Office Action for U.S. Appl. No. 11/693,346 mailed on May 18, 2011.
OA dated Jun. 24, 2010 for U.S. Appl. No. 11/844,729, 21 pages.
OA dated Sep. 29, 2010 for U.S. Appl. No. 11/683,763, 21 pages.
Written Opinion of PCT/JP2007/054138 dated Jul. 25, 2007.
International Search Report for PCT/JP2007/054138 dated Jul. 25, 2007.
Office Action for U.S. Appl. No. 11/844,729 mailed on Jun. 11, 2009.
Office Action for U.S. Appl. No. 11/844,729 mailed on Nov. 19, 2009.
International Search Report for PCT/JP2007/052902 dated Jan. 25, 2008.
Office Action for U.S. Appl. No. 11/674,514 mailed on Jul. 29, 2009.
Office Action for U.S. Appl. No. 11/674,514 mailed on Mar. 10, 2010.
Written Opinion of PCT/JP2007/057511 dated Jul. 23, 2007.
International Search Report for PCT/JP2007/057511 dated Jul. 23, 2007.
Office Action for U.S. Appl. No. 11/693,346 mailed on Sep. 25, 2009.
U.S. Appl. No. 12/722,876, filed Mar. 12, 2010.
Japanese Office Action for 2006-036652 mailed on Jan. 26, 2010.

(56) References Cited

OTHER PUBLICATIONS

Japanese Office Action for Japanese Patent Application No. 2006-095744 mailed on Jun. 7, 2011.
Japanese Office Action for Japanese Patent Application No. 2006-091628 mailed on Jun. 7, 2011.
Japanese Office Action for Japanese Patent Application No. 2006-063965 mailed on Jun. 6, 2011.
OA dated Apr. 4, 2012 for U.S. Appl. No. 12/722,876, 42 pages.
OA dated Apr. 13, 2012 for U.S. Appl. No. 11/683,763, 25 pages.
Japanese Office Action for Japanese Patent Application No. 2006-36652 mailed on Feb. 14, 2012.
OA dated Oct. 23, 2012 for U.S. Appl. No. 12/722,876, 17 pages.
Office Action dated Apr. 15, 2013 for U.S. Appl. No. 12/722,876, 21 pages.
Office Action dated Apr. 25, 2013 for U.S. Appl. No. 11/674,514, 47 pages.
Japanese Office Action for Japanese Patent Application No. 2011-083406 mailed on Apr. 9, 2013.
Notice of Allowance mailed Aug. 26, 2013 for U.S. Appl. No. 12/722,876, 29 pages.
Final Office Action dated Oct. 30, 2013 for U.S. Appl. No. 11/674,514, 21 pages.

* cited by examiner

| CLIENT UNIT IDENTIFIER | CENTRAL DISPLAY MODE |
|---|---|
| A | 1 |
| B | 0 |
|  |  |

13A DISPLAY MANAGEMENT AREA

SERVER UNIT, A CLIENT UNIT, AND A RECORDING MEDIUM IN A COMPUTER SYSTEM

CROSS-REFERENCE TO RELATED APPLICATIONS

This application is based upon and claims the benefit of priority from prior Japanese Patent Application No. 2008-070365, filed Mar. 18, 2008, the entire contents of which are incorporated herein by reference.

BACKGROUND OF THE INVENTION

1. Field of the Invention

This invention relates to a server unit, a client unit, and a recording medium in a server-based computing system (SBC) which enables an application input to, output from, or displayed on a client unit to operate on a server unit in a server-client system connected via a network, such as a LAN (Local Area Network).

2. Description of the Related Art

Each terminal unit (i.e., a PC terminal) connected to a network, such as an in-house LAN, activates and executes an application, such as a document preparation program or a table creation program, independently. The resulting various files have been stored in a storage unit at the terminal unit. Alternatively, the terminal unit stores the various files in an external storage medium, such as a magnetic disk, an optical disk, or a small semiconductor memory, or in a storage unit managed by a server unit on a network.

With such a conventional server-client system, the created files are managed by each terminal unit. Therefore, if the terminal unit should be lost or taken out illegally and passed into a third party's hands, the saved files might be read and important or confidential information be leaked.

Furthermore, since each terminal unit runs an application independently, the application has to be updated, changed, or added on a terminal unit basis, resulting in complex management and an increase in the cost.

To overcome the above problems, a recent server-client system has introduced an SBC (Server-Based Computing) system which causes all the applications input to, output from, and displayed on each terminal to be run on a server unit and all the created files to be managed on a server.

In such a server-based computing system, the drawing data of the application run on the server unit is transferred to a terminal unit (or a client unit). The client unit then displays the drawing data.

Recently, even in a server-based computing system, a mobile terminal with a small display screen, such as a mobile phone, has been considered to be used as a client unit.

With the conventional server-based computing system, when a mobile terminal with a small display screen is used as a client unit, the area of the drawing data displayed on the display screen of the mobile terminal is a part of the original area, since the display screen data (or drawing data) has been normally created so as to correspond to the screen size of a PC terminal. Therefore, each time the area of the drawing data the user wants to look at is not displayed, the user has to, for example, scroll the screen to change the display area.

Particularly, when a list box or a text box existing on the drawing data is to be operated frequently, a problem arises: it is very complicated to display the object area neatly to fit the display area.

BRIEF SUMMARY OF THE INVENTION

It is an object of the invention to easily display the area of information the user wants to see without changing the display area frequently even if the display screen of a client unit is small.

According to an aspect of the invention, there is provided a server unit in a server-based computing system which includes drawing data creating means for creating drawing data according to an input event from a client unit and drawing data transmitting means for transmitting the drawing data created by the drawing data creating means to the client unit, the server unit comprising: object selection determining means which determines whether the input event from the client unit is the selection of an object included in the drawing data; transmission request means which, if the object selection determining means has determined that the input event from the client unit is the selection of an object, requesting the client unit to transmit display screen information that sets a display screen area on the drawing data; display area information acquisition means which acquires the display area information transmitted from the client unit in response to the display area information transmission request of the transmission request means; object fit-in determining means which determines whether the area of the object selected on the drawing data fits in the display screen area corresponding to the display area information acquired by the display area information acquisition means; display area information changing means which, if the object fit-in determining means has determined that the area of the object selected on the drawing data does not fit in the display screen area corresponding to the display area information, changing the display area information so that the area of the object may fit in the display screen area; and display area information transmitting means which transmits the display area information changed by the display area information changing means to the client unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
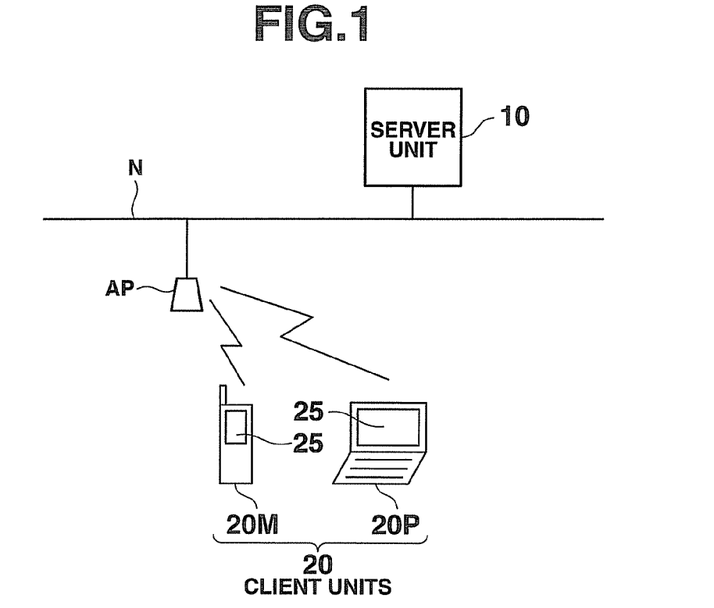
FIG. 1 is a block diagram showing the configuration of a server-based computing system which includes a server unit 10 and its client units (20P, 20M), ... according to an embodiment of the invention.

FIG. 1 is a block diagram showing the configuration of a server-based computing system which includes a server unit 10 and its client units (20P, 20M), ... according to an embodiment of the invention.

The server-based computing system comprises a server unit 10 and a plurality of client units 20 (20P, 20M), ... which are connected to a network N composed of a LAN (Local Area Network) or a WAN (Wide Area Network).

The server unit 10 is a personal computer connected by a wire to, for example, the network N. Of the client units 20, 20P is a portable personal computer connected wirelessly via an access point AP to the network N and 20M is a mobile phone connected wirelessly via the access point AP to the network N.

The server unit 10 has various application programs, including a document preparation program, a spreadsheet program, an address book program, a memo pad program, a presentation support program, a mail handling program, an Internet connection program, and a Web display program. The server unit 10 activates an application program according to an operation input (or an input event) from the client units 20 (20P, 20M), . . . connected to the server unit 10 and executes the processing.

In the server unit 10, the display output drawing data created by the execution of the application program corresponding to the operation input signal from the client unit 20, . . . is not only converted into transfer drawing data but also compressed and encrypted and is transmitted (or transferred) to the accessing client units 20, . . . .

Then, the client units 20 (20P, 20M), . . . decompress and decrypt the drawing data transferred from the server unit 10. The resulting drawing data is displayed on the display unit 25.

The server unit 10 has the function of, when the operation input signal from the client unit 20 is an input signal to specify a predetermined object area (a list box or a text box) existing in the drawing data as an operational object, creating information that indicates a display position on the drawing data and its area so that the object area on the drawing data may fit in the display screen (25) of the client unit and transmitting (or notifying) the information to the client unit 20.

The client unit 20 has the function of cutting out the drawing data according to the information indicating the display position and area on the drawing data notified by the server unit 10 and displaying the drawing data on the display screen (25).

Figure 2:
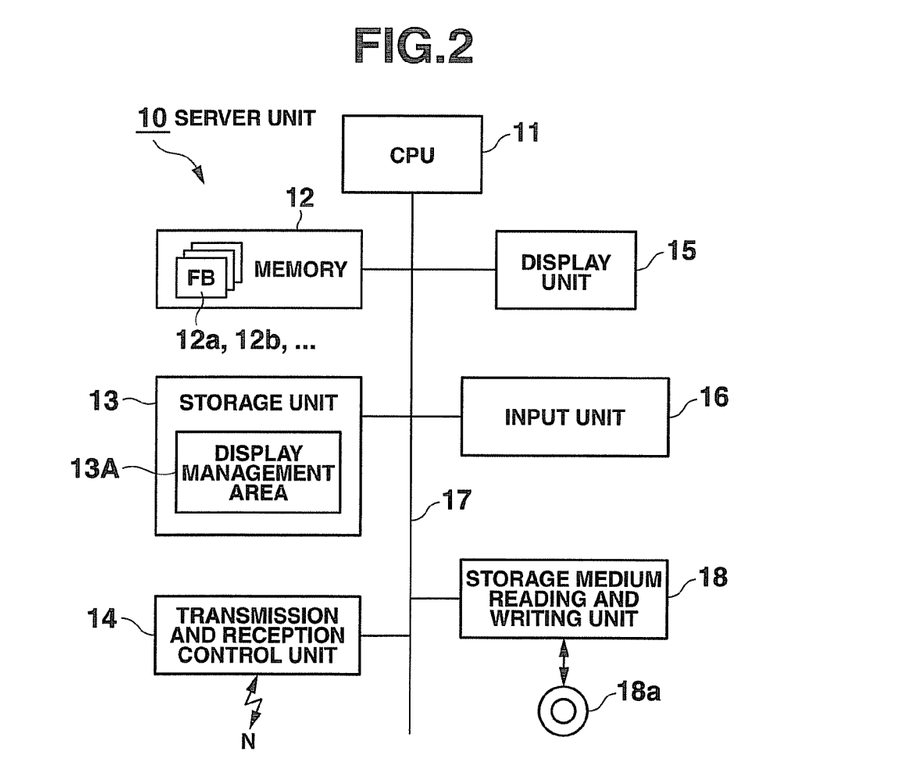
FIG. 2 is a block diagram showing a circuit configuration of the server unit 10 in the server-based computing system.

FIG. 2 is a block diagram showing a circuit configuration of the server unit 10 in the server-based computing system.

The server unit 10 includes a CPU 11 acting as a computer. Connected via a bus 17 to the CPU 11 are a memory 12 composed of a hard disk or a flash ROM, a storage unit 13 composed of a RAM, a transmission and reception control unit 14 for the client units 20, a display unit 15, an input unit 16, and a storage medium reading and writing unit 18 which reads and writes data from and into an external storage medium 18a, such as an optical disk or a magnetic disk.

The CPU 11 controls the operation of each section of the circuit using the storage unit 13 as a working memory according to a system program or various application programs previously stored in the memory 12, read from the external storage medium 18a into the memory 12, or read from a program server on the network N into the memory 12. The CPU 11 activates and executes the various programs according to a process command signal or the like corresponding to a key input signal from the input unit 16 or a user operation (or input event) from the client units 20 (20P, 20M), . . . received via the transmission and reception control unit 14.

In the server unit 10, various data items created according to the application program activated and executed according to the input event signal from the client unit 20 are stored in the memory 12 in such a manner that they are caused to correspond to the user ID. The display drawing data is written into virtual frame buffers (FB) 12a, 12b, . . . prepared so as to correspond to the individual client units 20, . . . in the memory 12. Then, the drawing data is converted into transfer drawing data by extracting image-changed parts from the preceding drawing data and the present drawing data (or the difference between the preceding drawing data and the present drawing data). The transfer drawing data is transferred from the transmission and reception control unit 14 to the client unit 20, which displays the drawing data.

In the storage unit 13 of the server unit 10, a display management area 13A is secured.

Figure 3:
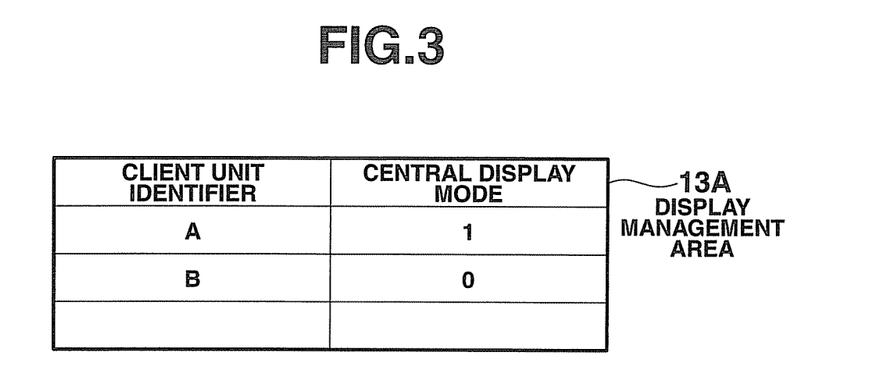
FIG. 3 is a table showing the contents of management data in a display management area 13A secured in a storage unit 13 of the server unit 10.

FIG. 3 is a table showing the contents of management data in the display management area 13A secured in the storage unit 13 of the server unit 10.

In the display management area 13A, a display-mode management data item ("1" or "0") set and notified by the user for each of the client units 20, . . . is stored so as to correspond to the identifier (A, B, . . . ) of each of the client units 20. Management data items "1" and "0" represent the presence and absence of the setting of the central display mode, respectively.

When having received from the client unit 20 set in the central display mode a command signal to set a specific object area (such as a list box or a text box) on the drawing data as an operational object, the server unit 10 creates information indicating a display position and an area on the drawing data so as to align the object area on the drawing data with the center of the display screen (25) of the client unit 20 and transmits (or notifies) the information to the client unit 20. On the other hand, when having received from the client unit 20 not set in the central display mode a command signal to set a specific object area (such as a list box or a text box) on the drawing data as an operational object, the server unit 10 creates information indicating a display position and an area on the drawing data so as to align the object area on the drawing data with the top left of the display screen (25) of the client unit 20 and transmits (or notifies) the information to the client unit 20.

Figure 4:
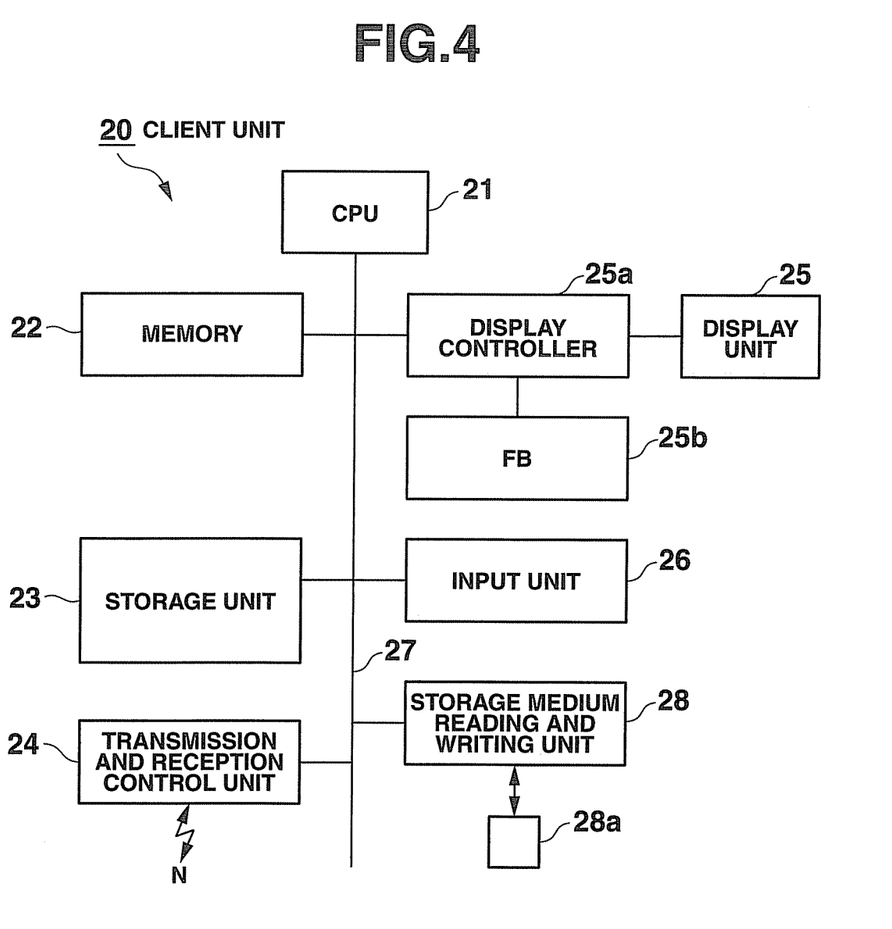
FIG. 4 is a block diagram showing a circuit configuration of a client unit 20 (20P, 20M) in the server-based computing system.

FIG. 4 is a block diagram showing a circuit configuration of the client unit 20 (20P, 20M) in the server-based computing system.

The client unit 20 includes a CPU 21 serving as a computer. Connected via a bus 27 to the CPU 21 are a memory 22 composed of a flash ROM, a storage unit 23 composed of a RAM, a transmission and reception control unit 24 for the server unit 10, a display unit 25 via a display controller 25a, an input unit 26, and a storage medium reading and writing unit 28 which reads and writes data from and into an external storage medium 28a, such as a memory card.

The display controller 25a includes a frame buffer (FB) 25b. The frame buffer (FB) 25b stores, for example, VGA (Video Graphics Array)-size drawing data created and transferred by the server unit 10 and then decompressed. The display controller 25a cuts out the drawing data stored in the frame buffer (FB) 25b in the display position according to the user operation and in an area corresponding to the display screen size of the display unit 25 and displays the data on the display unit 25.

At this time, when having been informed by the server unit 10 of the display position and area on the display unit 25 where the drawing data is to be displayed, the display controller 25a cuts out the drawing data corresponding to the display position and area and displays the data on the display unit 25.

The CPU 21 controls the operation of each section of the circuit using the storage unit 23 as a working memory according to a system program (or a client control program) previously stored in the memory 22, read from the external storage medium 28a into the memory 22, or read from a program server on the network N into the memory 22. The CPU 21 activates and executes the client control program according to a key input signal from the input unit 26, or an application response signal, transfer drawing data, display position, and area information received via the transmission and reception control unit 24 from the server unit 10.

In the server-based computing system, each time the drawing data is created and updated, an area where the image changed after the update of the drawing is difference-extracted from the drawing data created at the server unit 10 according to such an event as a key input from the client unit 20. The extracted data is transferred as transfer drawing data to the client unit 20. Then, the client unit 20 rewrites only the image-changed area on the drawing data stored in the frame buffer (FB) 25b, thereby updating the drawing data. This enables the amount of data transferred from the server unit 10 to the client unit 20 to be decreased remarkably.

The following is an explanation of a selected object corresponding display function of, when a specific object area (a list box LB or a text box TB) displayed on the display screen (25) of the client unit 20 is selected as an operational object in the server-based computing system with the above configuration, displaying the specific object area under the control of the server unit 10 in such a manner that the object area fits the display screen (25).

Figure 5A:
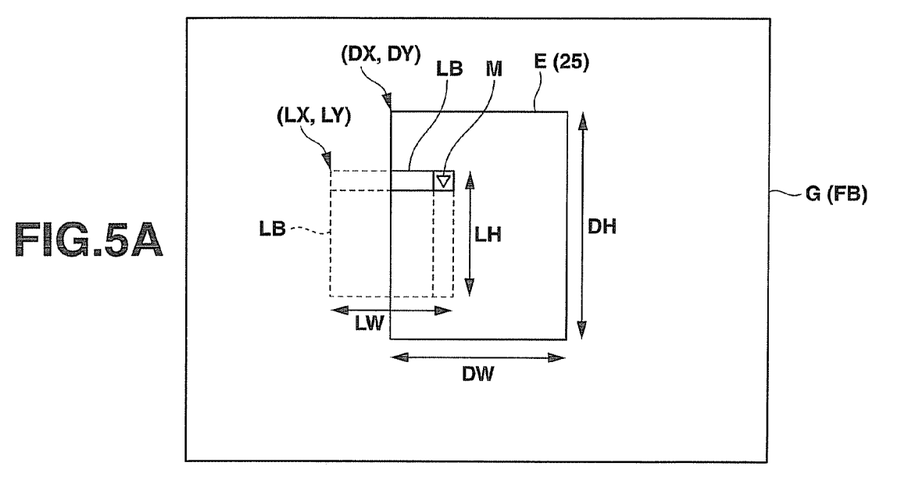
FIGS. 5A and 5B are diagrams to help explain a display control operation (part 1) when a list box LB is selected and opened on the display screen (25) of the client unit 20 in the server-based computing system.
Figure 5B:
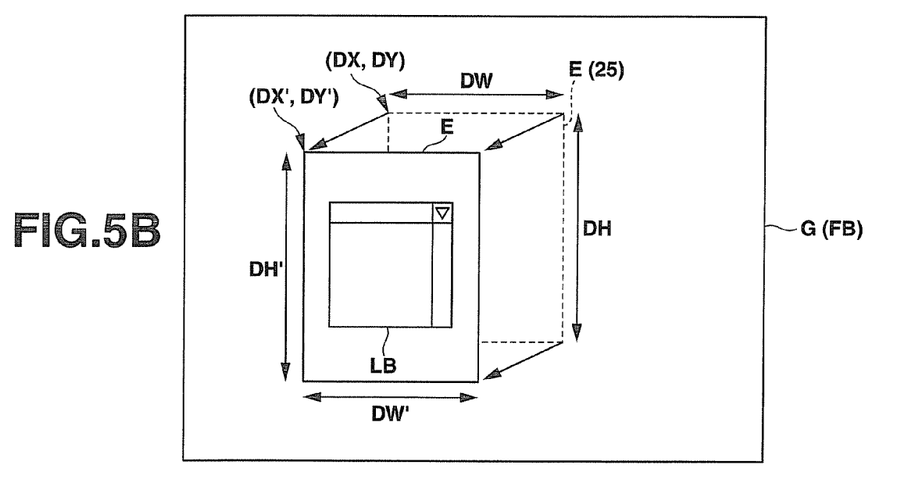

FIGS. 5A and 5B are diagrams to help explain a display control operation (part 1) when a list box LB is selected and opened on the display screen (25) of the client unit 20 in the server-based computing system.

Figure 6A:
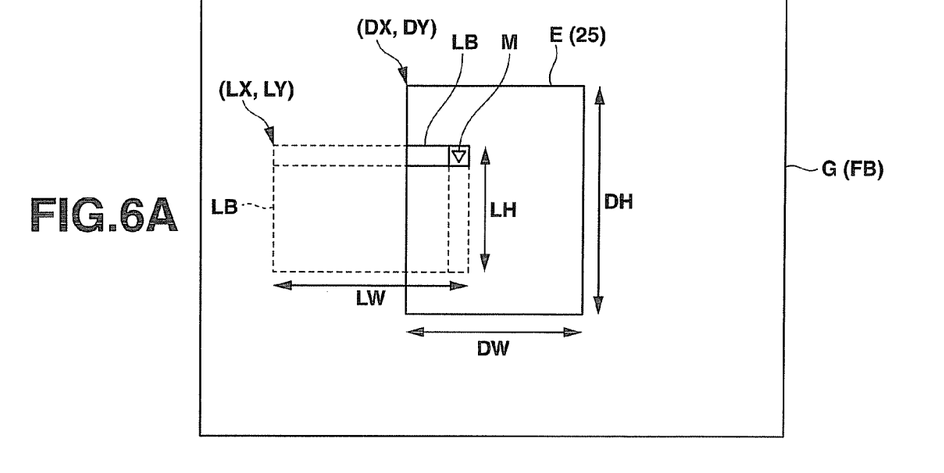
FIGS. 6A and 6B are diagrams to help explain a display control operation (part 2) when a list box LB is selected and opened on the display screen (25) of the client unit 20 in the server-based computing system.
Figure 6B:
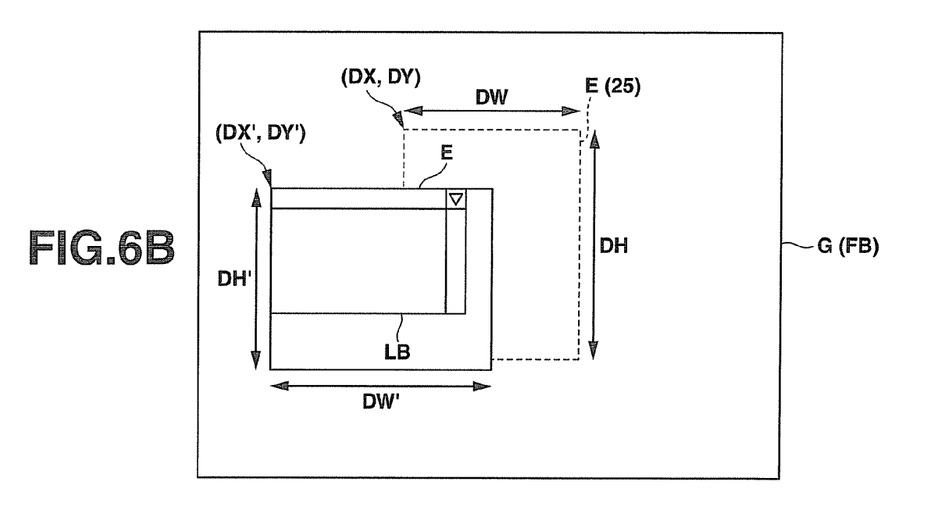

FIGS. 6A and 6B are diagrams to help explain a display control operation (part 2) when a list box LB is selected and opened on the display screen (25) of the client unit 20 in the server-based computing system.

Figure 7A:
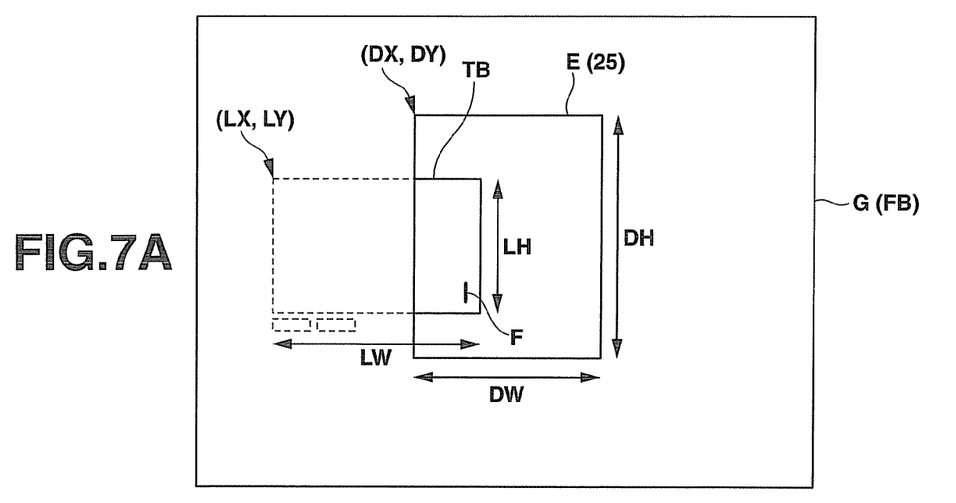
FIGS. 7A and 7B are diagrams to help explain a display control operation when a text box TB is selected on the display screen (25) of the client unit 20 in the server-based computing system.
Figure 7B:
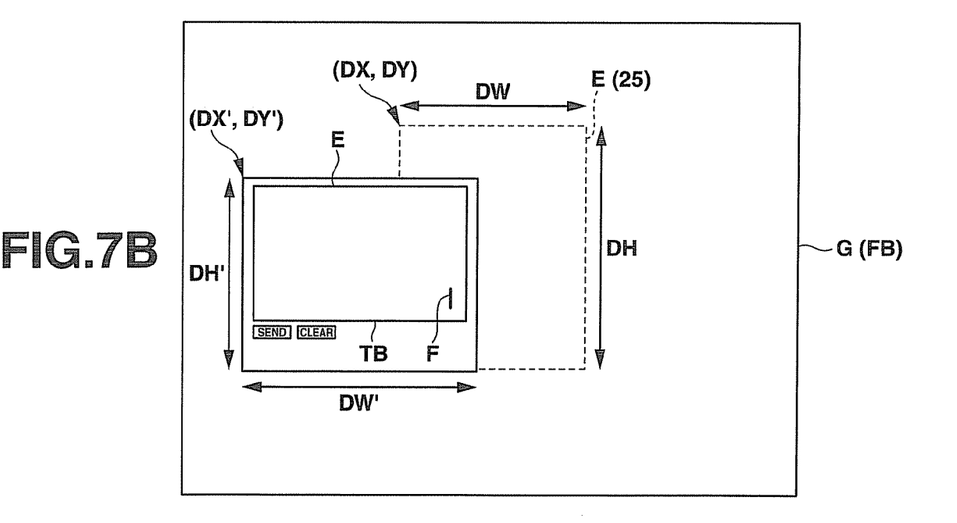

FIGS. 7A and 7B are diagrams to help explain a display control operation when a text box TB is selected on the display screen (25) of the client unit 20 in the server-based computing system.

In FIGS. 5A to 7B, "G" indicates, for example, VGA-size drawing data stored in the frame buffer (FB) 25b of the client unit 20, "E" a display screen area of the drawing data G to be displayed on the display unit 25, "LB" a list box to be expanded on the drawing data G, "M" a tap mark to be tap-operated by the user when selecting the list box LB, "TB" a text box existing on the drawing data G, and "F" a focus mark to be operated by the user when selecting the text box TB.

The display screen area E (25) for the drawing data G (FB) is managed by the starting point coordinates (DX, DY) corresponding to the top left of the display screen area E and the height DH and width DW using the starting point coordinates (DX, DY) as a reference.

The area size of the list box LB and that of the text box TB are managed by the height LH and width LW. The list box LB and text box TB are on the drawing data G and are object areas to be operated.

Specifically, for example, when the tap mark M in the list box LB on the drawing data G is tap-operated as shown in FIG. 5A, a cutout position and area for the drawing data of the display screen area E are changed as shown in FIG. 5B in such a manner that an expanded list box LB fits in the display screen area E.

Moreover, for example, when the tap mark M in the list box LB on the drawing data G is tap-operated as shown in FIG. 6A, if the width LW of the expanded list box LB does not fit in the width DW of the display screen area E, the cutout position and area for the drawing data of the display screen area E are changed as shown in FIG. 6B in such a manner that the display screen area E is rotated horizontally so that the list box LB may fit in the display screen area E.

Similarly, for example, when the focus mark F in the text box TB on the drawing data G is specified as shown in FIG. 7A, if the width LW of the text box TB does not fit in the width DW of the display screen area E, the cutout position and area for the drawing data of the display screen area E are changed as shown in FIG. 7B in such a manner that the display screen area E is rotated horizontally so that the text box TB may fit in the display screen area E.

Figure 8:
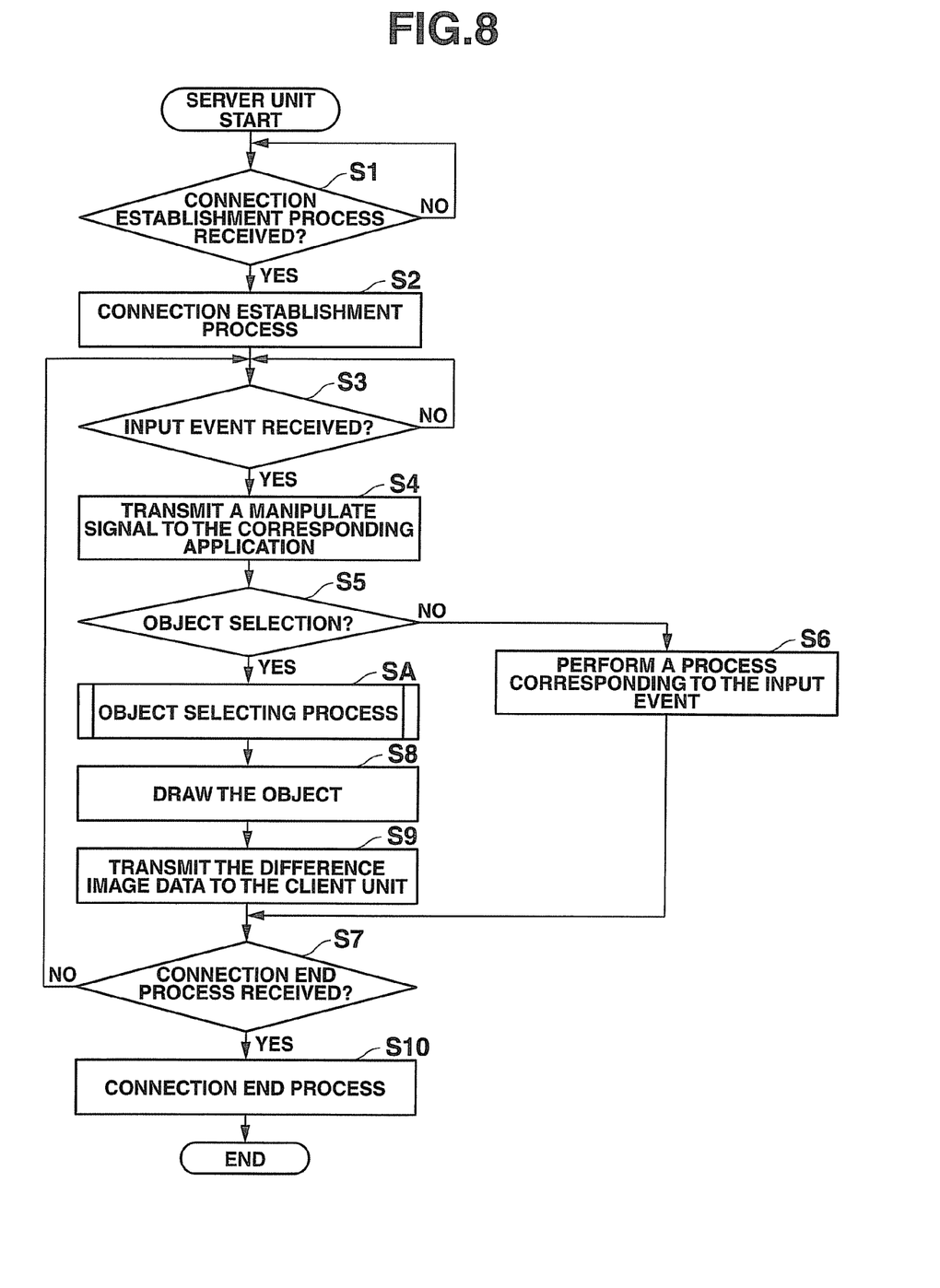
FIG. 8 is a flowchart to explain a server control process carried out by the server unit 10 in the server-based computing system.

FIG. 8 is a flowchart to explain a server control process carried out by the server unit 10 in the server-based computing system.

Figure 9:
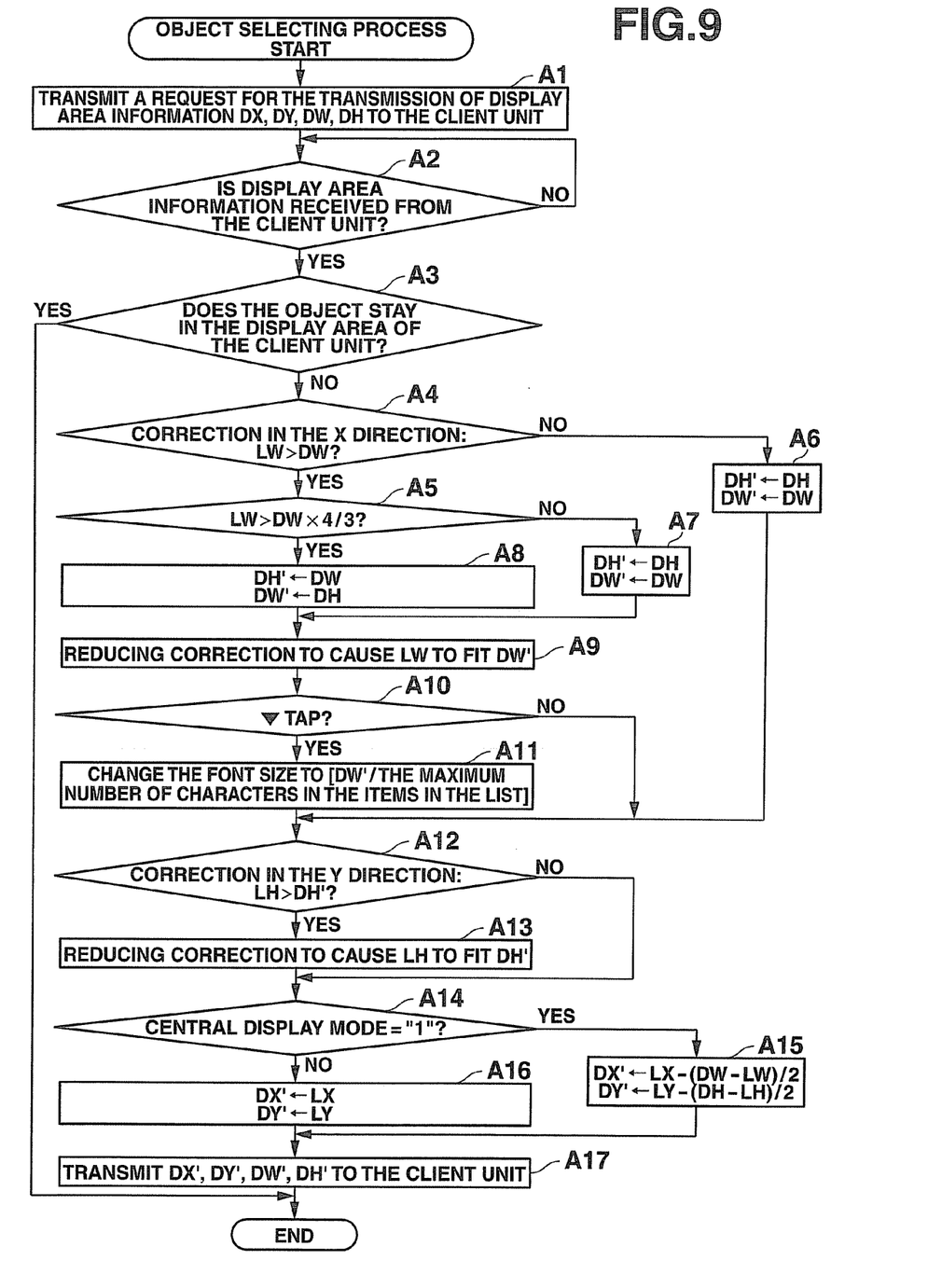
FIG. 9 is a flowchart to explain an object selecting process involved in the server control process in the server-based computing system.

FIG. 9 is a flowchart to explain an object selecting process related to the server controlling process in the server-based computing system.

Figure 10:
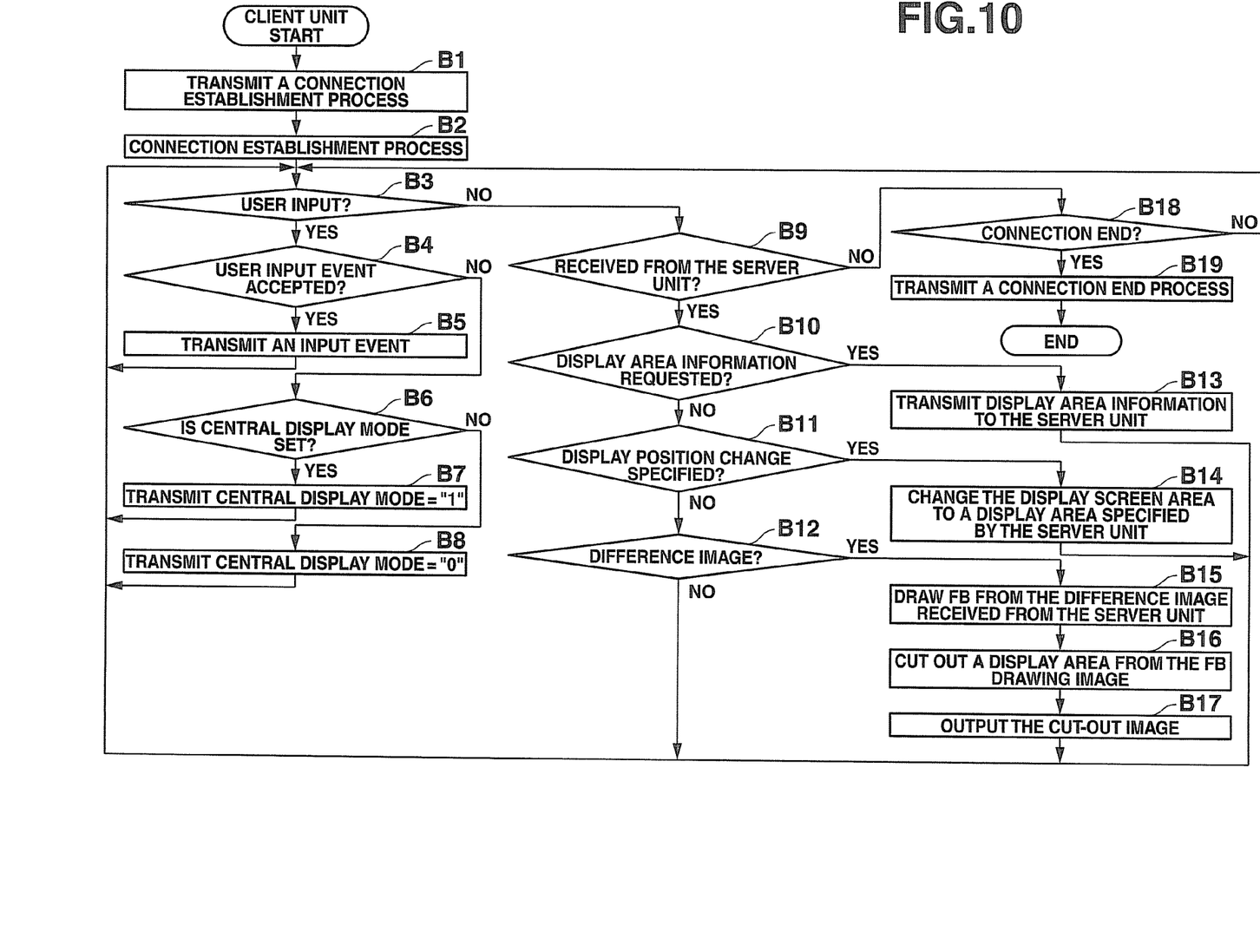
FIG. 10 is a flowchart to explain a client control process carried out by the client unit 20 in the server-based computing system.

FIG. 10 is a flowchart to explain a client control process carried out by the client unit 20 in the server-based computing system.

First, at the client unit 20, when a request for connection to the server unit 10 is specified by a user operation on the input unit 26, the transmission and reception control unit 24 transmits a connection establishment request to the server unit 10 (step B1 in FIG. 10). Then, a connection establishing process is carried out between the client unit 20 and the server unit 10 on the basis of an authentication process or the like (step B2).

When having received the connection establishment request transmitted from the client unit 20 (step S1 of FIG. 8), the server unit 10 establishes connection with the client unit 20 on the basis of an authentication process or the like (step S2).

With the connection between the server unit 10 and client unit 20 being established, if an input event, such as the opening of an arbitrary Web page, is accepted (Yes in step B4) according to the user input at the client unit 20 (Yes in step B3 of FIG. 10), the input event is transmitted to the server unit 10 (step B5).

At the server unit 10, if, for example, an input event of opening a Web page transmitted from the client unit 20 has been received (Yes in step S3 of FIG. 8), a manipulate signal corresponding to the input invent is transmitted to the corresponding application program, such as a Web browser (step S4). Then, the application program executes a process corresponding to the input event (step S5 (No)→S6). Specifically, the application program opens the user-specified Web page, writes the drawing data into the frame buffer (FB) 12a in the memory 12 corresponding to the client unit 20 which input the event, converts the data into transfer drawing data, and transmits the transfer drawing data to the client unit 20.

When the client unit 20 has received, for example, the drawing data on the Web page transmitted from the server unit 10 (Yes in step B9 of FIG. 10), the data is judged to be a difference image from the drawing data G stored in the frame buffer (FB) 25b (Yes in step B12). The drawing data judged to be the difference image is written into the frame buffer (FB) 25b (step B15).

For example, in the early stages of the opening of the Web page, the drawing data on the entire page is received as a difference image and written into the frame buffer (FB) 25b. Thereafter, if the contents of the drawing of the Web page have been updated, only the difference image of the updated part of the drawing is received together with its position information and the drawing data G stored in the frame buffer (FB) 25b is updated (step B9 (Yes)→B12 (Yes)→B15).

The display controller 25a cuts out the drawing data G stored in the frame buffer (FB) 25b as a display screen area E corresponding to the display starting point coordinates (DX, DY) according to the user operation and the height and width (DH×DW) corresponding to the display screen size of the display unit 25 as shown in FIG. 5A (step B16) and outputs the display screen area E on the display unit 25, which displays the area E (step B17).

This causes the drawing data G created by the server unit 10 according to the user input event at the client unit 20 to be updated and stored sequentially into the frame buffer (FB) 25b and displayed as a display screen area E corresponding to the user operation on the display unit 25.

At the client unit 20, when a specific object area (a list box LB or a text box TB) existing in the drawing data G displayed on the display unit 25 is specified as an operational object, if the user wants to position and display the object area in the center of the display screen area E, the central display mode is set according to the user operation on the input unit 26 (step B3 (Yes)→B6).

If the central display mode has been set (Yes in step B6), the setting data "1" of the central display mode is transmitted to the server unit 10 (step B7). If the setting of the central display mode has been cancelled (No in step B6), the setting cancel data "0" of the central display mode is transmitted to the server unit 10 (step B8).

When the server unit 10 has received the setting data "1" or the setting cancel data "0" of the central display mode transmitted from the client unit 20, management data for the central display mode corresponding to the client unit 20 stored and managed in the display management area 13A (see FIG. 3) in the storage unit 13 is set to "1" which indicates setting or "0" which indicates no setting (step S3 (Yes)→S4, S5 (No)→S6 in FIG. 8).

(Process of Changing the Display Screen Area E in Object Selection)

With the display screen area E of the drawing data G including the tap mark M in the list box LB as shown in, for example, FIG. 5A being cut out and displayed on the display unit 25 in the client unit 20 according to the control process performed between the server unit 10 and the client unit 20 (step B9 (Yes)→B12 (Yes)→B15 to B17 in FIG. 10), when the tap mark M is specified by the user operation to open the list box LB, an input event signal indicating the selection of the list box LB is transmitted to the server unit 10 (step B3 (Yes)→B4 (Yes)→B5).

When the server unit 10 has received the input event signal indicating the selection of the list box LB transmitted from the client unit 20 (Yes in step S3 of FIG. 8), it is determined that the list box LB (object) has been selected (Yes in step S4 and step S5) and control is passed to an object selecting process in FIG. 9 (step SA).

When the object selecting process is activated, a signal requesting the transmission of display area information (DX, DY, DW, DH) corresponding to the present display screen area E is transmitted to the client unit 20 where the object selection event has been input (step A1).

When the client unit 20 has received the request for the transmission of the present display area information (DX, DY, DW, DH) transmitted from the server unit 10 (step B9 (Yes)→B10 (Yes) in FIG. 10), display area information (DX, DY, DW, DH) which sets the display screen area E of the drawing data G displayed on the display unit 25 is transmitted to the server unit 10 as shown in FIG. 5A (step B13).

When the server unit 10 has received the display area information (DX, DY, DW, DH) transmitted from the client unit 20 (Yes in step A2 of FIG. 9), it is determined whether the object area (in this case, the list box LB (LX, LY, LW, LH)) selected this time by the user fits in the display screen area E set on the basis of the display area information (DX, DY, DW, DH) (step A3).

If it has been determined that the object area (LX, LY, LW, LH) selected this time by the user fits in the display screen area E set on the basis of the display area information (DX, DY, DW, DH) from the client unit 20 (Yes in step A3), the selected object is expanded on the drawing data G stored in the frame buffer (FB) 12a (step S8 of FIG. 8) and transfer drawing data composed of the resulting difference image data is transmitted to the client unit 20 (step S9).

Then, the client unit 20 receives the difference image data of the selected object and updates the drawing data G stored in the frame buffer (FB) 25b (step B9 (Yes)→B12 (Yes)→B15 in FIG. 10). The drawing data G is cut out in such a manner that the selected object area fits in the display screen area E and is displayed on the display unit 25 (steps B16, B17).

In step A3 in the object selecting process at the server unit 10, if it has been determined that the area (LX, LY, LW, LH) of the list box LB selected this time by the user does not fit in the display screen area E set on the basis of the display area information (DX, DY, DW, DH) from the client unit 20 as shown in FIG. 5A (No in step A3 of FIG. 9), whether the list box LB has to be corrected in the X direction is determined, depending on whether the width LW of the list box LB is greater than the width DW of the display area information (step A4).

As shown in FIG. 5A, if it has been determined that the list box LB need not be corrected in the X direction because the width LW of the list box LB is less than the width DW of the display area information (No in step A4), the height and width to which a change display area is to be set are caused to remain unchanged (DH→DH') (DW→DW') (step A6).

Then, whether the list box LB has to be corrected in the Y direction is determined, depending on whether the height LH of the list box LB is greater than the height DH' of the display area information (step A12).

As shown in FIG. 5A, if it has been determined that the list box LB need not be corrected in the Y direction because the height LH of the list box LB is less than the height DH' of the display area information (No in step A12), it is determined on the basis of the management data stored in the display management area 13A of the storage unit 13 whether the client unit 20 has been set in the central display mode "1" (step A14).

Then, if it has been determined that the client unit 20 has been set in the central display mode "1" (Yes in step A14), half the value obtained by subtracting the width LW of the list box LB from the width DW of the display area is subtracted from the starting point coordinate LX in the X direction of the list box LB using equation (1), thereby setting the X-direction starting point coordinate (DX') of the display screen area E. Moreover, half the value obtained by subtracting the height LH of the list box LB from the height DH of the display area is subtracted from the starting point coordinate LY in the Y direction of the list box LB using equation (2), thereby setting the Y-direction starting point coordinate (DY') of the display screen area E (step A15).

$$DX' \leftarrow LX - (DW - LW)/2 \qquad \text{equation (1)}$$

$$DY' \leftarrow LY - (DH - LH)/2 \qquad \text{equation (2)}$$

In this case, the changed display area information (DX', DY', DW', DH') set in step A6 and step A15 is transmitted to the client unit 20 (step A17).

Then, the selected list box LB is expanded on the drawing data G presently stored in the frame buffer (FB) 12a (step S8 of FIG. 8) and transfer drawing data composed of the resulting difference image data is transmitted to the client unit 20 (step S9).

Then, the client unit 20 changes the display screen area E for the drawing data G on the basis of the display area information (DX', DY', DW', DH') received from the server unit 10 (step B9 (Yes)→B11 (Yes)→B14 in FIG. 10). Then, the client unit 20 receives the difference image data of the list box LB transmitted from the server unit 10 and updates the drawing data G stored in the frame buffer (FB) 25b (step B9 (Yes) →B12 (Yes)→B15). The drawing data G is cut out according to the changed display screen area E (DX', DY', DW', DH') and the list box LB is displayed on the display unit 25 so as to be positioned in the center of the display screen area E as shown in FIG. 5B (steps B16, B17).

In step A4, if it has been determined that the list box LB (or text box TB) has to be corrected in the X direction because the width LW of the list box LB (or text box TB) is greater than the width DW of the display area information as shown in, for example, FIG. 6A (or FIG. 7A) (Yes in step A4 of FIG. 9), it is determined whether the width LW of the list box (or text box TB) is greater than 4/3 of the width DW of the display area information (step A5).

If it has been determined that the width LW of the list box LB (or text box TB) is greater than but not greater than 4/3 of the width DW of the display area information (No in step A5), the height and width to which a changed display area is to be set are caused to remain unchanged (DH→DH') (DW→DW') (step A7) and the width LW of the list box LB (or text box TB) is reduced to fit the width DW' of the display area (step A9).

In step A5, if it has been determined that the width LW of the list box LB (or text box TB) is greater than 4/3 of the width DW of the display area (Yes in step A5) as shown in, for example, FIG. 6A (or FIG. 7A), the width DW of the present display area is set to the height DH' of the changed display area and the height DH of the present display area is set to the width DW' of the changed display area, thereby rotating the height and width of the display screen area E for the drawing data G as shown in FIG. 6B (or FIG. 7B) (step A8). Then, the width LW of the list box LB (or text box TB) is reduced to fit the width DW' of the rotated display area (step A9).

Then, it is determined whether the object selecting process is carried out according to an input event corresponding to the operation of specifying the tap mark M to make the list box LB an operational object, that is, it is determined whether the object selecting process is the process of selecting the list box LB or the text box TB (step A10).

If it has been determined that the object selecting process is the process of selecting the list box LB corresponding to the operation of specifying the tap mark M (Yes in step A10), the font size of each text data item written in the list box LB is changed to the font size obtained by dividing the width DW' of the list box LB by the maximum number of characters in the items in the list (step A11). This causes the text data in each list to be adjusted so as to fit in the width LW of the list box LB reduced in step A9.

Thereafter, in step A12, if it has been determined that the list box LB (or text box TB) also has to be corrected in the Y direction because the height LH of the list box LB (or text box TB) is greater than the height DH' of the display area information (Yes in step A12), the height LH of the list box LB (or text box TB) is reduced to fit the height DH' of the display area (step A13).

Then, if it has been determined that the client unit 20 has not been set in the central display mode "1" (No in step A14), the drawing starting point coordinates (LX, LY) of the list box LB (or text box TB) are set to the display starting point coordinates (DX', DY') of the changed display screen area E as shown in, for example, FIG. 6B (step A16).

Then, in the case of the list box LB shown in FIG. 6B or the text box TB shown in FIG. 7B, the changed display area information (DX', DY', DW', DH') set in the steps A8 to A14→A16 is transmitted to the client unit 20 (step A17).

Then, the selected list box LB (or text box TB) is expanded on the drawing data G presently stored in the frame buffer (FB) 12a (step S8 of FIG. 8) and transfer drawing data composed of the difference image data is transmitted to the client unit 20 (step S9).

As a result, in the client unit 20, the display screen area E for the drawing data G is changed on the basis of the display area information (DX', DY', DW', DH') received from the server unit 10 (step B9 (Yes)→B11 (Yes)→B14 in FIG. 10). Then, the difference image data for the list box LB (or text box TB) transmitted from the server unit 10 is received and the image data G stored in the frame buffer (FB) 25b is updated (step B9 (Yes)→B12 (Yes)→B15). Then, the drawing data G is cut out according to the rotated and changed display screen area E (DX', DY', DW', DH') and the list box LB (or text box TB) is displayed on the display unit 25 so as to be alighted with the position (DX', DY'=LX, LY) of the starting point of the rotated display screen area E as shown in FIG. 6B (or FIG. 7B) (steps B16, B17).

Thereafter, at the client unit 20, when the connection with the server unit 10 has been terminated (Yes in step B18), a connection end signal is transmitted to the server unit 10 (step B19). Then, when the server unit 10 has received the connection end signal transmitted from the client unit 20 (Yes in step S7 of FIG. 8), the connection with the client unit 20 is terminated (step S10).

Accordingly, with the selected object corresponding display function of the server-based computing system configured as described above, when a specific object (list box LB or text box TB) on the drawing data displayed on the client unit 20 is selected as an operational object, it is determined whether the object to be drawn and updated at the server unit 10 fits in the present display screen area E on the client unit 20. If it has been determined that the object to be drawn and updated does not fit in the present display screen area E of the client unit 20, change information on the starting point coordinates (DX', DY') and the height and width (DH'×DW') of the display screen area E for the drawing data is created so that the object to be drawn and updated on the drawing data may fit in the display screen area E of the client unit 20. The created information is transmitted (or notified) to the client unit 20.

Consequently, in the client unit 20, since the display screen area E is changed according to the object on the drawing data transferred from the server unit 10 and the changed display screen area E is displayed on the display unit 25, even if the client unit 20 is a mobile terminal (20M, 20P) and its display screen is small, the display screen area E need not be changed and the area of the object to be manipulated by the user can be displayed easily.

Furthermore, with the selected object corresponding display function of the server-based computing system, if the width LW of the object to be drawn and updated at the server unit 10 is greater than the width DW of the display screen area E of the client unit 20, the width LW of the object is reduced to fit the width DW of the display screen area E. Moreover, if the height LH of the object is greater than the height DH of the display screen area E of the client unit 20, the height LH of the object is reduced to fit the height DH of the display screen area E.

In addition, with the selected object corresponding display function of the server-based computing system, if the width LW of the object to be drawn and updated at the server unit 10 is greater than the width DW of the display screen area E of the client unit 20 in the client unit 20 with a vertically long display screen area E, update information on the starting point coordinates (DX', DY') and height and width (DH'×DW') obtained by rotating the display screen area E for the drawing data by 90 degrees is created and the update information is transmitted (or notified) to the client unit 20.

Consequently, even if the client unit 20 is a mobile terminal (20M, 20P) and its display screen is small, the display screen area E need not be changed and the area of the object area to be manipulated by the user can be displayed so as to fit in the display screen area E reliably.

Furthermore, with the selected object corresponding display function of the server-based computing system, if the object to be drawn and updated at the server unit 10 is the list box LB and the width LW of the list box LB has been reduced to fit the width DW of the display screen area E, the font size of the character data written in the list on the basis of the width LW (=DW) of the reduced list box LB is changed, which enables the list box LB to be manipulated by the user to be displayed so as to fit in the display screen area E reliably.

OTHER EMBODIMENT

With the server-based computing system of the embodiment, the drawing data G created at the server unit 10 according to the input event from the client unit 20 is transferred from the server unit 10 to the client unit 20 which input the event. At the client unit 20, the drawing data G is cut out and displayed in the display screen area E corresponding to the display unit 25. Accordingly, if a specific object has been selected as an operational object on the drawing data displayed on the client unit 20 (Yes in step S5), the server unit 10 creates change information on the starting point coordinates (DX', DY') of and the height and width (DH'×DW') of the display screen area E for the drawing data so that the object to be drawn and updated at the server unit 10 may fit in the display screen area E at the client unit 20 and transmits (or notifies) the change information to the client unit 20 (step SA).

In contrast, with a server-based computing system according to one other embodiment of the invention, the client unit 20 transmits position and size information (DX, DY, DW, DH) on the present display screen area E on the drawing data G created by the server unit 10 each time the client unit 20 transmits its input event to the server unit 10. The server unit 10 cuts out drawing data for the part corresponding to the position and size information (DX, DY, DW, DH) on the present display screen area E from the drawing data G created according to the input event and transfers the cut-out drawing data to the client unit 20 which input the event, thereby causing the drawing data to be displayed on the display unit 25.

The initial position and size information on the display screen area E displayed at the client unit 20 may be stored in the server unit in advance. The server unit 10 may calculate the position and size information (DX, DY, DW, DH) on the display screen area E of the client unit 20 on the basis of the initial information each time the server unit receives the input event transmitted from the client unit 20.

With the server-based computing system of the one other embodiment, if a specific object on the drawing data has been selected as an operational object at the client unit 20, the server unit 10 creates change information on the starting point coordinates (DX', DY') of and the height and width (DH'×DW') of the display screen area E for the drawing data so that the specific object drawn and updated by the server unit 10 may fit in the display screen area E of the client unit 20 (step A2 to step A16 in FIG. 9), cuts out the drawing data for the part corresponding to the changed display screen area E, and transfers the cut-out drawing data to the client unit 20. Consequently, even with the server-based computing system of the one other embodiment, if the client unit 20 is a mobile terminal (20M, 20P) and its display screen is small as in the above embodiment, the display screen area E need not be changed and the area of the object to be manipulated by the user can be displayed easily.

Each of the processes carried out in the server-based computing system described in each of the embodiments, including the control process in the server unit 10 shown in the flowchart of FIG. 8, the object selecting process related to the control process in the server unit 10 shown in the flowchart of FIG. 9, and the control process in the client unit 20 shown in the flowchart of FIG. 10, can be stored into a memory card (e.g., a ROM card or a RAM card), a magnetic disk (e.g., a floppy disk or a hard disk), an optical disk (e.g., a CD-ROM or a DVD), or external recording mediums 18a, 28, such as semiconductor memories, in the form of a program that causes a computer to execute instructions. Then, the program stored in such a medium can be delivered. The computers (CPU 11 and CPU 21) of the server unit 10 and client unit 20 read the programs stored in the external recording mediums 18a, 28a into the storage units (the memories 12, 22 and storage units 13, 23). The operations of the computers are controlled by the read-in programs, thereby realizing the selected object corresponding display function explained in each of the embodiments, which enables the same processes as described above to be executed.

The data of the programs to realize the individual processes can be transferred through a communication network (N) in the form of program code. The program data can be taken out of a computer unit (or a program server) connected to the communication network (N) and stored into memory units (e.g., the memories 12, 22 or storage units 13, 23), thereby realizing the selected object corresponding display function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A non-transitory server unit in a server-based computing system which includes (a) a drawing data creating section that creates drawing data including an object which comprises at least one of a list box and a text box according to an input event from a client unit and (b) a drawing data transmitting section that transmits the drawing data created by the drawing data creating section to the client unit, the server unit comprising:
    an object selection determining section which determines whether the input event from the client unit is a selection of a single object included in the drawing data;
    a display area information request section which, if the object selection determining section has determined that the input event from the client unit is the selection of the single object, requests the client unit to transmit display area information found by the client unit indicating where the client unit presently displays, wherein the display area information corresponds to a part of the drawing data;
    a display area information acquisition section which acquires the display area information transmitted from the client unit;
    an object judging section which judges whether a display screen area corresponding to the display area information includes a part area of the single object selected on the drawing data;
    a display area information changing section which, if the object judging section has determined that the display screen area includes the part area of the single object selected on the drawing data, changes the display area information so that the display screen area includes all areas of the single object selected on the drawing data; and
    a display area information transmitting section which transmits the display area information changed by the display area information changing section to the client unit.

2. The non-transitory server unit according to claim 1, wherein the display area information changing section changes the display area information such that the area of the object corresponds with the display screen area and the area of the object comes at the center of a display screen.

3. A non-transitory server unit in a server-based computing system which includes a drawing data creating section that creates drawing data including an object which comprises at least one of a list box and a text box according to an input event from a client unit, a display area information acquisition section that acquires display area information indicating a display screen area on the drawing data in the client unit, and a drawing data transmitting section that, according to the display area information acquired by the display area information acquisition section, cuts out the drawing data created by the drawing data creating section and transmits the cut-out drawing data to the client unit, the server unit comprising:
    an object selection determining section which determines whether the input event from the client unit is a selection of a single object included in the drawing data;
    an object judging section which, if the object selection determining section has determined that the input event from the client unit is the selection of the single object, judges whether a display screen area corresponding to the display area information includes a part area of the single object selected on the drawing data acquired by the display area information acquisition section; and
    display area information changing section which, if the object judging section has determined that the display screen area includes the part area of the single object selected on the drawing data, changes the display area information so that the display screen area includes all areas of the single object selected on the drawing data.

4. The non-transitory server unit according to claim 3, wherein the display area information changing section changes the display area information such that the area of the object corresponds with the display screen area and the area of the object comes at the center of a display screen.

5. The non-transitory server unit according to claim 1 or 3, wherein the display area information includes (a) starting point coordinates corresponding to the top left of a display screen area in the drawing data and (b) height and width from the starting point coordinates.

6. The non-transitory server unit according to claim 5, further comprising:
    area size determining section which determines whether the area of the object selected on the drawing data is greater than the display screen area corresponding to the display area information acquired by the display area information acquisition section; and
    object area reducing section which, if the area size determining section has determined that the area of the object selected on the drawing data is greater than the display screen area, reducing the area of the object on the drawing data to correspond with the display screen area.

7. The non-transitory server unit according to claim 5, wherein the display area information changing section includes display area information rotation changing section which changes the display area information by rotating the height and width of the display area information.

8. The non-transitory server unit according to claim 6, further comprising font size changing section which, if the object area reducing section has reduced the area of the object on the drawing data to correspond with the display screen area, changes the font size of the characters written in the area of the object to correspond with the reduced area of the object.

9. A non-transitory client unit in a server-based computing system which includes an input event transmitting section that transmits an input event corresponding to a user operation to a server unit, a drawing data receiving section that receives drawing data including an object which comprises at least one of a list box and a text box created and transferred by the server unit in response to an input event transmitted by the input event transmitting section, and a display control section that cuts out the drawing data received by the drawing data receiving section and displays the cut-out drawing data in a display screen area, the client unit comprising:
    a transmission request receiving section which receives from the server unit a request to transmit display area information that sets the display screen area;
    a display area information transmitting section which transmits the display area information to the server unit in response to the reception of the display area information transmission request from the transmission request receiving section;
a change information receiving section which receives the display area information changed by the server unit in response to the transmission of the display area information to the server unit by the display area information transmitting section; and
a display screen area changing section which, if the change information receiving section has received the changed display area information, changes the display screen area so as to correspond to the changed display area information, wherein if the display screen area has changed to include a part area of a single object selected from the drawing data, the display screen area is changed to include all areas of the single object selected on the drawing data.

10. The non-transitory client unit according to claim 9, wherein the display screen area changing section changes, if the change information receiving section has received the changed display area information, the display screen area which is cut out by the display control section so as to correspond to the changed display area information.

11. A non-transitory recording medium from which a computer of a server unit is able to read instructions and in which a process for transmitting drawing data including an object which comprises at least one of a list box and a text box, created in accordance with an input event from a client unit, to the client unit is recorded as a program, said program comprising the processes of:
determining whether the input event from the client unit is a selection of single object included in the drawing data;
requesting the client unit to transmit display screen information that sets a display screen area on the drawing data, if it is determined that the input event from the client unit is a selection of the object;
acquiring the display area information transmitted from the client unit in response to the transmission request;
determining whether a display screen area corresponds to the display screen area information that includes a part area of the single object included in the drawing data;
changing the display area information so that the display screen area includes all areas of the single object selected on the drawing data in response to the display screen area including the part area of the single object included in the drawing data; and
transmitting the changed display area information to the client unit.

12. The non-transitory recording medium from which the computer of the server unit is able to read instructions according to claim 11, wherein the program comprises the process of changing the display area information such that the area of the object aligns with the display screen area and the area of the object comes at the center of a display screen if it is determined that the area of the object selected on the drawing data, as a whole, does not align with the display screen area corresponding to the display area information.

13. A non-transitory recording medium from which a computer of a server unit is able to read instructions, and in which processes for:
creating drawing data including an object which comprises at least one of a list box and a text box according to an input event from a client unit;
acquiring display area information indicating a display screen area on the drawing data in the client unit;
cutting out the created drawing data according to the acquired display area information; and
transmitting the cut-out drawing data to the client unit, are recorded as a program, said program comprising the processes of:
determining whether the input event from the client unit is selection of a single object included in the drawing data;
determining whether a display screen area corresponding to the display area information includes a part area of the single object selected on the drawing data if it is determined that the input event from the client unit is a selection of the single object; and
changing the display area information so that the display screen area includes all areas of the single object selected on the drawing data in response to the display screen area including the part area of the single object included in the drawing data.

14. The non-transitory recording medium from which the computer of the server unit is able to read instructions according to claim 13, wherein the program comprises the process of changing the display area information such that the area of the object corresponds with the display screen area and the area of the object comes at the center of a display screen if it is determined that the area of the object selected on the drawing data, as a whole, does not align with the display screen area corresponding to the display area information.

15. A non-transitory recording medium from which a computer of a client unit is able to read instructions and in which processes for:
transmitting an input event corresponding to a user operation to a server unit;
receiving drawing data including an object which comprises at least one of a list box and a text box created and transferred by the server unit in response to a transmitted input event; and
cutting out the received drawing data and displaying the cut-out drawing data in a display screen area, are recorded as a program, the program comprising the processes of:
receiving from the server unit a transmission request that sets the display screen area;
transmitting the display area information to the server unit in response to reception of the transmission request for the display area information;
receiving changed display area information in response to the transmission of the display area information to the server unit; and
changing the display screen area so as to correspond to the changed display area information, if the changed display area information is received, wherein if the display screen area has changed to include a part area of a single object selected from the drawing data, the display screen area is changed to include all areas of the single object selected on the drawing data.

16. The non-transitory recording medium from which a computer of a client unit is able to read instructions according to claim 15, wherein the program comprises the process of changing the display screen area to be cut out so as to correspond to the changed display area information, if the changed display area information is received.

* * * * *